(12) United States Patent
Gordon et al.

(10) Patent No.: US 6,567,486 B1
(45) Date of Patent: May 20, 2003

(54) APPARATUS AND METHOD FOR FINDING LOCATION OF A MOBILE UNIT

(75) Inventors: Alexander Gordon, Morris Plains, NJ (US); Alex Matusevich, Morris Plains, NJ (US); Jonathan Tobias, Florham Park, NJ (US); Sheng-Jen Tsai, Bridgewater, NJ (US); Robert C. Wang, Mendham Township, NJ (US)

(73) Assignee: Lucent Technologies Inc., Murray Hill, DE (US)

( * ) Notice: Subject to any disclaimer, the term of this patent is extended or adjusted under 35 U.S.C. 154(b) by 0 days.

(21) Appl. No.: 09/360,574

(22) Filed: Jul. 26, 1999

(51) Int. Cl.[7] .................................................. H04L 7/02

(52) U.S. Cl. ...................................................... 375/360

(58) Field of Search ................................. 375/323, 342, 375/360; 455/440, 456, 61

(56) References Cited

U.S. PATENT DOCUMENTS 5,579,345 A * 11/1996 Kroeger et al. ............. 375/261

* cited by examiner

Primary Examiner—Stephen Chin
Assistant Examiner—Kevin Kim
(74) Attorney, Agent, or Firm—Steve Mendelsohn; Yuri Gruzdkov

(57) ABSTRACT

A phase-modulated signal such as a quadrature phase-shift-keyed (QPSK) signal in a wireless communication system is demodulated by frequency demodulating the phase-modulated signal. The phase-modulated signal is separated into first and second copies, the first copy is phase demodulated to generate demodulated symbols, and the second copy is frequency demodulated to generate, e.g., a measure of the instantaneous frequency of the phase-modulated signal. The instantaneous frequency measure is processed to identify one or more symbol transitions, and the identified transitions are used to generate event signals having signature properties (signature events). These signature events are used in traditional Time Difference of Arrival tdoa algorithms to accurately determine position of a mobile unit in the wireless communication system.

36 Claims, 4 Drawing Sheets

FIG. 7

| | | S0 | S1 | S2 | S3 | S4 | S5 | S6 | S7 | S8 | S9 | S10 | S11 | S12 | S13 |
|---|---|---|---|---|---|---|---|---|---|---|---|---|---|---|---|
| | | | | | | | | SYMBOL | | | | | | | |
| | SYNC 1 | $-\frac{1}{4}$ | $-\frac{1}{4}$ | $-\frac{1}{4}$ | $3\frac{1}{4}$ | $\frac{1}{4}$ | $3\frac{1}{4}$ | $-3\frac{1}{4}$ | $3\frac{1}{4}$ | $-3\frac{1}{4}$ | $-\frac{1}{4}$ | $3\frac{1}{4}$ | $\frac{1}{4}$ | $-\frac{1}{4}$ | $-\frac{1}{4}$ |
| | SYNC 2 | $-\frac{1}{4}$ | $-\frac{1}{4}$ | $-\frac{1}{4}$ | $3\frac{1}{4}$ | $-3\frac{1}{4}$ | $3\frac{1}{4}$ | $\frac{1}{4}$ | $3\frac{1}{4}$ | $\frac{1}{4}$ | $-\frac{1}{4}$ | $3\frac{1}{4}$ | $-3\frac{1}{4}$ | $-\frac{1}{4}$ | $-\frac{1}{4}$ |
| SYNC WORD | SYNC 3 | $-3\frac{1}{4}$ | $\frac{1}{4}$ | $3\frac{1}{4}$ | $-3\frac{1}{4}$ | $-3\frac{1}{4}$ | $-\frac{1}{4}$ | $\frac{1}{4}$ | $-3\frac{1}{4}$ | $-3\frac{1}{4}$ | $\frac{1}{4}$ | $\frac{1}{4}$ | $\frac{1}{4}$ | $-3\frac{1}{4}$ | $\frac{1}{4}$ |
| | SYNC 4 | $\frac{1}{4}$ | $-3\frac{1}{4}$ | $3\frac{1}{4}$ | $\frac{1}{4}$ | $\frac{1}{4}$ | $-\frac{1}{4}$ | $-3\frac{1}{4}$ | $\frac{1}{4}$ | $\frac{1}{4}$ | $-3\frac{1}{4}$ | $-3\frac{1}{4}$ | $-3\frac{1}{4}$ | $\frac{1}{4}$ | $-3\frac{1}{4}$ |
| | SYNC 5 | $\frac{1}{4}$ | $3\frac{1}{4}$ | $\frac{1}{4}$ | $-3\frac{1}{4}$ | $-3\frac{1}{4}$ | $-\frac{1}{4}$ | $\frac{1}{4}$ | $-\frac{1}{4}$ | $\frac{1}{4}$ | $-3\frac{1}{4}$ | $-3\frac{1}{4}$ | $3\frac{1}{4}$ | $\frac{1}{4}$ | $3\frac{1}{4}$ |
| | SYNC 6 | $-3\frac{1}{4}$ | $3\frac{1}{4}$ | $-3\frac{1}{4}$ | $\frac{1}{4}$ | $\frac{1}{4}$ | $-\frac{1}{4}$ | $-3\frac{1}{4}$ | $-\frac{1}{4}$ | $-3\frac{1}{4}$ | $\frac{1}{4}$ | $\frac{1}{4}$ | $3\frac{1}{4}$ | $-3\frac{1}{4}$ | $3\frac{1}{4}$ |

US 6,567,486 B1

APPARATUS AND METHOD FOR FINDING LOCATION OF A MOBILE UNIT

BACKGROUND OF THE INVENTION

1. Field of the Invention

The present invention generally relates to wireless telecommunications, and particularly, to locating mobile units in wireless time division multiple access (TDMA) systems which utilize differential modulation or other types of phase modulation.

2. Description of the Related Art

The proliferation of mobile units and their technology and usage has revealed various applications for the ability to locate mobile units. These applications include "911" calls, tourist and travel information, tracking of unauthorized cell phone usage and illegal activities, and locating of commercial and government vehicles, to name a few. Conventional wireless telecommunications systems can only determine the nearest base station which typically locates a mobile unit to an accuracy of 3 to 10 miles.

However, FCC regulations, as dictated in FCC Docket 94-102, require location accuracy of about 400 feet of mobile units (cellular/PCS users) for E-911 (Emergency-911) service by Oct. 1, 2001.

Therefore, a great deal of emphasis has been placed on developing systems that can track the location of mobile units more accurately. One known method for locating mobile units is time difference of arrival (TDOA) which has been used for many years, at least in such applications as LORAN and GPS (Global Positioning System). The application of this process to cell phones includes measuring the time of arrival of the same signal (transmitted from a mobile unit) at a multiplicity of locations (base stations) and comparing the times to determine how long the signal took to reach each base station.

However, TDOA algorithm has strict requirements. For example, to use a TDOA algorithm in wireless telecommunications system utilizing antennas, at least three different base stations must be accurately synchronized in time and these base stations must simultaneously capture a known transmitted signal from a mobile unit. Only then can a TDOA algorithm can be used to compute the location of the mobile unit. Thus, one of the challenges lies in the selection of a known transmitted signal which may be simultaneously captured by a plurality of base stations. In the case of E-911 service which requires location accuracy of about 400 feet, the received signals must be time stamped with an accuracy of a few (about 400) nanoseconds to provide a sufficiently accurate computation of the mobile location. Therefore, capturing of a traditional transmitted signal which has a duration of a few microseconds (typically 41.2 microseconds) is unsuitable for E-911 purposes. The use of traditional transmitted signals will result in a location accuracy of a few miles because, as a broad principle, a wireless signal propagates at the speed of light and, consequently, there corresponds one foot of accuracy for each nanosecond in the duration. To achieve the desired location accuracy of 400 feet, a moment within a transmitted signal (an event) or a phase change (an event) within a signal must be captured. This event must be very specific in nature and must be agreed upon by all of the base stations involved in the location determination.

SUMMARY OF THE INVENTION

An apparatus and method for generating and measuring a known event having a duration of a few nanoseconds are provided.

The present invention provides an improved phase demodulation technique for use with quadrature phase-shift-keyed (QPSK) signals and other types of phase-modulated signals in a communication system. This phase demodulation technique generates a "signature event" which is based at least in part on frequency information generated by frequency demodulation of the phase-modulated signal. This signature event has the duration of a few nanoseconds and has resistance to gain and noise variations.

In an illustrative embodiment, a phase-modulated signal is separated into first and second portions. The first portion is then phase demodulated to generate demodulated symbols, while the second portion is frequency demodulated to generate a measure of the instantaneous frequency of the phase-modulated signal. The instantaneous frequency measure is then processed to identify one or more symbol transitions. The identified transitions are then used to generate an event which is so precise and unique that it has "signature" properties.

This signature event can be used by base stations as an agreed-upon event to be captured and used in TDOA algorithms for mobile unit location determination. The use of this signature event results in a location accuracy of a few meters.

BRIEF DESCRIPTION OF THE DRAWINGS

Other aspects, features, and advantages of the present invention will become more fully apparent from the following detailed description, the appended claims, and the accompanying drawings in which:

FIG. 7 is a table showing a set of synchronization words which may be utilized to provide signature events for an exemplary TDMA system.

DETAILED DESCRIPTION

A phase modulation technique known as $\pi/4$ DQPSK is utilized to transmit digital data in certain types of communication systems, such as wireless TDMA systems. In accordance with this technique, data is transmitted by changing the phase of a modulated signal. Each phase shift, over a specific period of time, is referred to as a symbol. The technique achieves an increase in spectral efficiency by multiplexing two signals in phase quadrature. The two signals, an iri-phase (I) signal and a quadrature (Q) signal 90° out of phase with the I signal, are modulated onto a carrier signal to form a QPSK signal suitable for transmission. In the case of $\pi/4$ DQPSK, the four possible phase shifts are $\pm\pi/4$ ($\pm 45°$) and $\pm\pi/4$ ($\pm 135°$), and a typical symbol period T in a conventional IS-136 or IS-54 wireless TDMA system is 41.2 microseconds.

Figure 1:
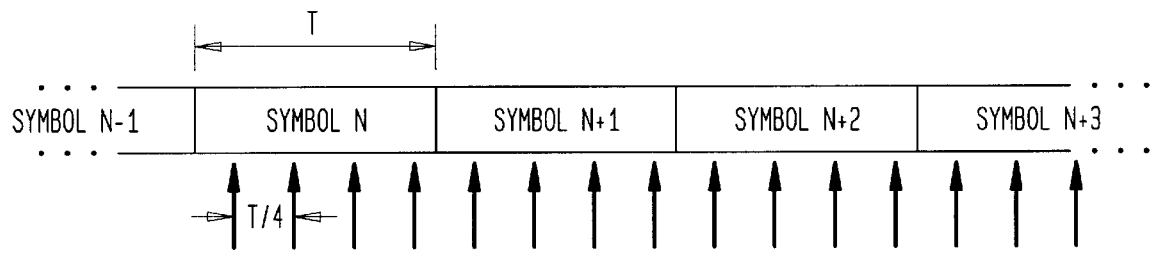
FIGS. 1, 2, and 3 illustrate sampling of symbols in accordance with a conventional $\pi/4$ DQPSK demodulation technique.

A conventional $\pi/4$ DQPSK demodulator suppresses the carrier signal and recovers the I and Q signals. The I and Q signals are sampled at intervals of T/4 and digitized using an analog-to-digital (A/D) converter. The digitized samples are then processed in a digital signal processor (DSP) to recover the phase of the symbol and its signal strength. FIG. 1 illustrates the T/4 sampling process for a given I or Q signal. The I or Q signal includes a stream of symbols denoted N−1, N, N+1, N+2, etc., in this example. Each of the symbols of the I or Q signal is sampled at intervals of T/4, as shown.

Figure 2:
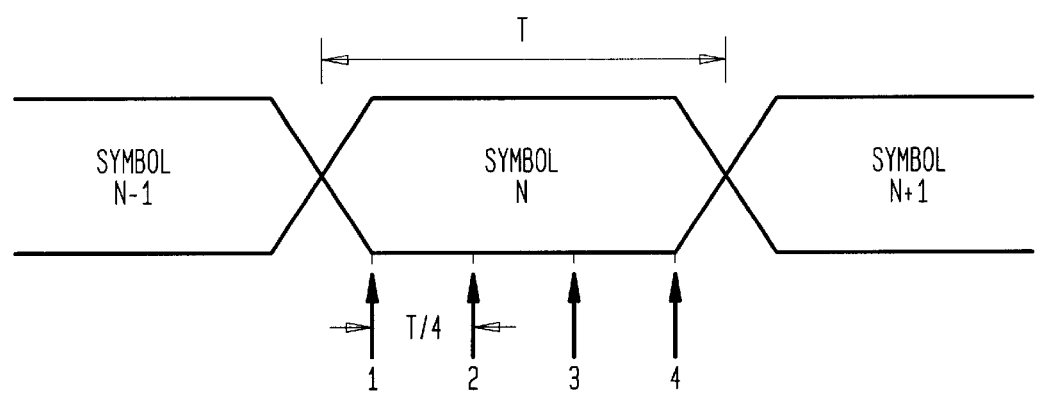
Figure 3:
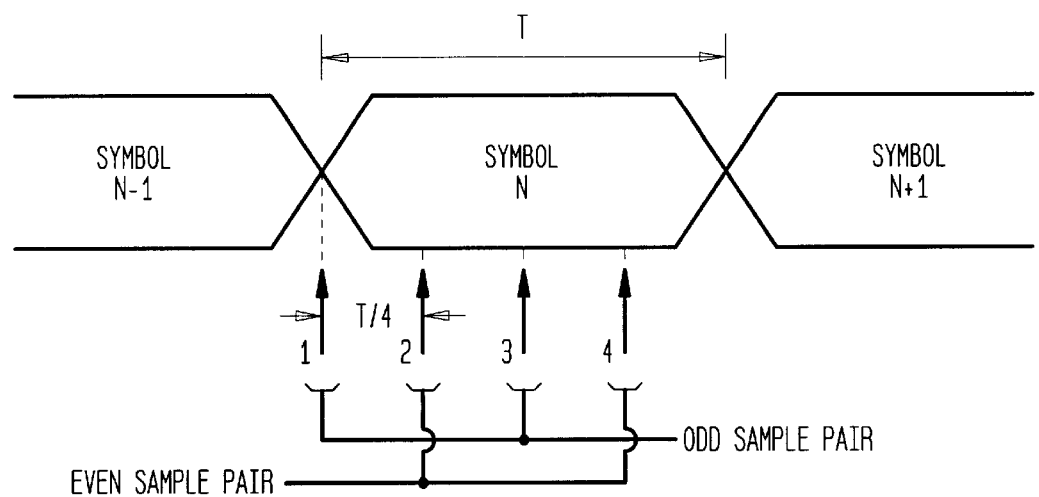

In general, at either a base station or a mobile unit in a wireless TDMA system, the T/4 sampling of received symbols in a DQPSK demodulator is generally asynchronous with respect to the transmitted symbol. The best case situation, illustrated in FIG. 2, is when the four T/4 samples for a given symbol are taken during the most stable portion of the current symbol, i.e., symbol N. The worst case, illustrated in FIG. 3, occurs when one of the T/4 samples is taken at the transition between the current symbol N and a previous symbol N−1 or a subsequent symbol N+1.

In the present invention, an improved phase demodulation technique having high accuracy is utilize to create a "signature event" which may be simultaneously captured by a plurality of base stations to compute mobile location.

Figure 4:
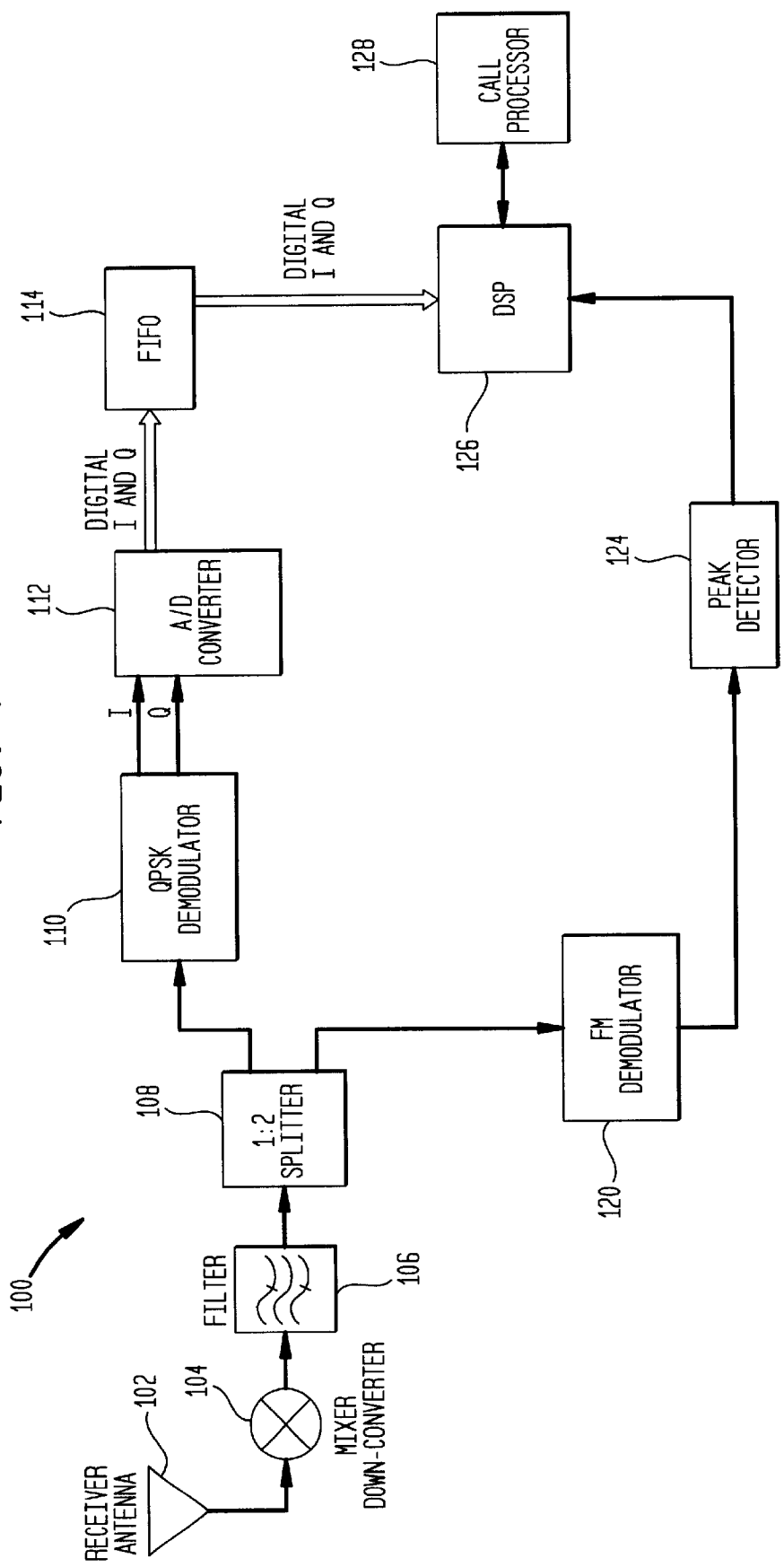
FIG. 4 a block diagram of a receiver in accordance with an illustrative embodiment of the invention.

FIG. 4 shows a block diagram of a base-station QPSK receiver 100 in accordance with an illustrative embodiment of the invention. QPSK receiver 100 may be used to demodulate, e.g., a π/4 DQPSK signal received from a mobile unit, such as that described in conjunction with FIGS. 1 through 3, or any other suitable type of QPSK signal.

A QPSK-modulated carrier signal received via a receiver antenna 102 is down-converted in a mixer/down-converter 104, and band-pass filtered in a filter 106 to recover a QPSK signal. The QPSK signal is then split into two separate copies in a 1:2 splitter 108. The first copy of the QPSK signal is applied to a conventional QPSK demodulator 110. The in-phase (I) and quadrature (Q) signals generated by QPSK demodulator 110 are applied to an analog/digital (A/D) converter 112 which samples the corresponding symbols to generate digital I and Q outputs for storage in a first-in first-out (FIFO) buffer 114.

In accordance with the invention, the second copy of the QPSK signal is passed through a frequency modulation (FM) demodulator 120 to generate a measure of the instantaneous frequency of the signal which is the derivative of the phase that contains the transmitted data.

FM demodulator 120 may include, e.g., an FM discriminator and/or other well-known FM demodulation circuitry. The instantaneous frequency output of FM demodulator 120 is then applied to a peak detector 124. Peak detector 124 captures peaks in the frequency output and generates a signature which is supplied to a digital signal processor (DSP) 126. DSP 126 uses this signature to generate an appropriate signature signal (signature event) to call processor 128. DSP 126 is responsible for demodulating the time slot symbols within a T/2 symbol period and recognizing the phase transition between two predetermined symbols. DSP 126 monitors the T/2 window and recognizes peak occurrences. Whenever a peak is recognized, DSP 126 reports this occurrence (signature event) to call processor 128. Call processor 128 receives the signature event and time-stamps it. The signature event can be used to determine the start and end of a given symbol in a stream of symbols as well as an event to be captured as part of the computation of a TDOA algorithm used to locate a mobile unit.

The signature event has a duration on the order of a few nanoseconds and thus can be used to meet the requirements of E-911 regulations.

Figure 5:
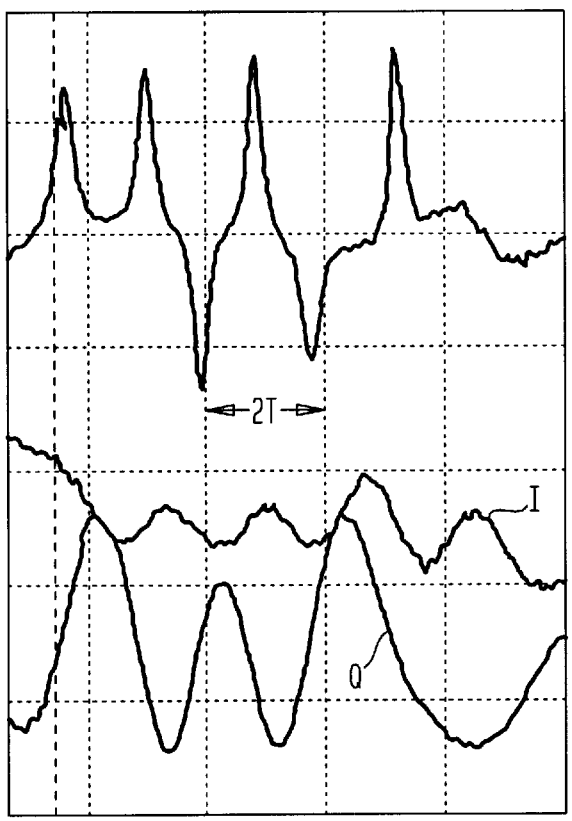
FIG. 5 shows an FM demodulator output which may be generated in the receiver of FIG. 4 along with corresponding demodulated I and Q output signals.

FIG. 5 shows an example of an FM demodulator output which may be generated in the receiver of FIG. 4 along with corresponding I and Q demodulated output signals. Each horizontal division in the plots of FIG. 5 corresponds to 2T, i.e., two times the symbol period T. The uppermost signal in FIG. 5 represent the signal output of FM demodulator 120 of FIG. 4, as generated from the second copy of the QPSK signal when the modulated data corresponds to a particular synchronization word, i.e., synchronization word Sync 1 of FIG. 7. The I and Q signals shown in FIG. 5 are the corresponding I and Q outputs of the QPSK demodulator 110, generated from the first copy of the same QPSK signal.

Figure 6:
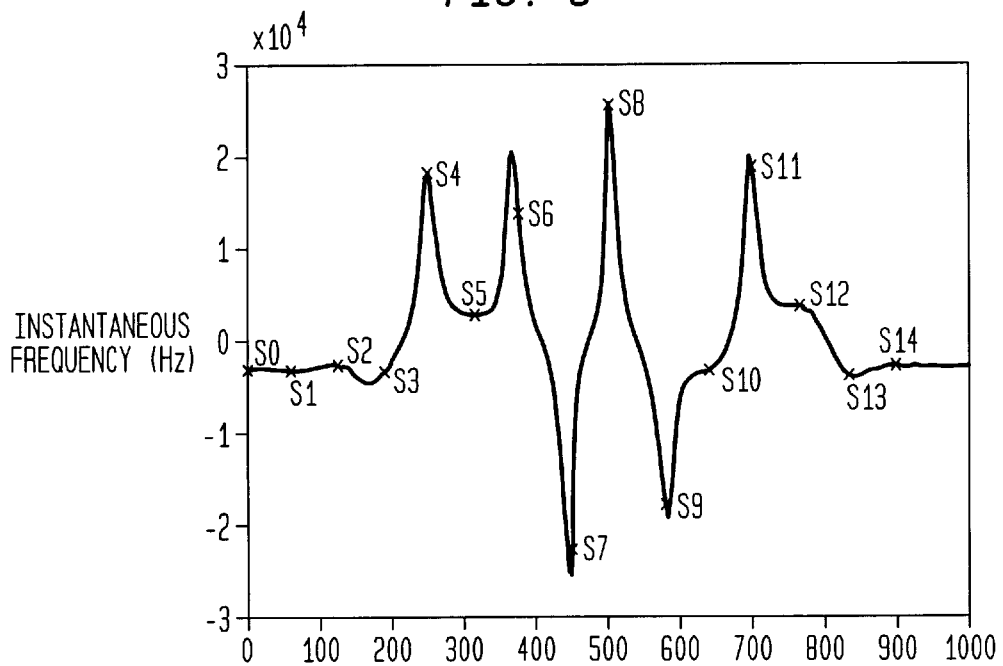
FIG. 6 shows a simulated version of the FM demodulator output of FIG. 5.

FIG. 6 shows a corresponding simulated version of the instantaneous frequency changes associated with the symbol-to-symbol phase changes in synchronization word Sync 1 of FIG. 7. It can be seen that the signal output of the FM discriminator as shown in FIG. 5 corresponds closely to the simulated instantaneous frequency changes as shown in FIG. 6. The table of FIG. 7 shows the phase changes over a set of 14 symbols, S0 through S13, for each of six possible synchronization words, i.e., Sync 1 through Synch 6, in an exemplary IS-136 TDMA system such as that described in the TIA/EIA 627 standard, IS-136.2-A. It should be understood that, although not explicitly shown in FIG. 7, the term "π" is implicit in the numeric values which are shown.

Each of the synchronization words shown in the table of FIG. 7 provides a unique signature that can be used in the receiver 100 to generate appropriate signature signals. The synchronization word signature at the output of the peak detector can thus be used to capture substantially the exact moment of the start of a phase change in a given symbol. DSP 126 may include, e.g., a conventional zero crossing detector and appropriate logic circuitry to make such a determination. Note that the phase changes given for synchronization word Sync 1 in FIG. 7 lead to the instantaneous frequency changes shown in FIGS. 5 and 6. For example, the first four symbols S0, S1, S2, and S3 of Sync 1 have phase shifts of −π/4, −π/4, −π/4 and 3 π/4, respectively, as shown in FIG. 7.

As a result, the symbols S0, S1, and S2 lead to no significant change in instantaneous frequency, but symbol S3 leads to a substantial change in instantaneous frequency between S3 and S4, as shown in FIG. 6. Detection of a signature corresponding to synchronization word Sync 1 can thus be used to determine the start of symbol S3, and this information can be used to establish an appropriate signature event.

By using such synchronization words to generate signature symbols, it is possible to ensure that the π/4 sampling will correspond to the desired timing, e.g., the best case T/4 sample timing as illustrated in and described in conjunction with FIG. 2.

Since the output of FM demodulator 120 is the instantaneous frequency of the signature event which is the derivative of the phase, there is no need for automatic gain control or automatic frequency correction. This means that the signature event generation technique of the present invention is resistant to factors such as gain variations, fades, speed, distance, filter group delay, and processing time associated with the transmitting source.

It should be emphasized that the exemplary demodulation techniques described herein are intended to illustrate the operation of the invention, and therefore should not be construed as limiting the invention to any particular embodiment or group of embodiments. For example, although well suited for implementation in a wireless TDMA system, the invention can be used in other applications such as GSM which uses GMSK modulation scheme. In addition, a system in accordance with the invention may include additional elements such as, for example, multiple base stations and mobile units, mobile switching centers (MSCs) for connecting one or more base stations to a public switched telephone network (PSTN), and memory or other storage elements for storing, e.g., system programs and configuration data, user data and billing information.

Furthermore, it will be apparent to those skilled in the art that the receiver shown herein for purposes of illustrating the invention may be implemented in many different ways, and may include a number of additional elements, e.g., additional down-converters, signal sources, filters, demodulators, detectors, signal processors, etc. configured in a conventional manner. More particularly, alternative embodiments of the invention may use different types of circuitry for generating a measure of frequency from a phase-modulated signal, and for generating a signature event based at least in part on the frequency measure. Furthermore, numerous other arrangements of circuitry may be used to generate a measure of frequency of a phase-modulated signal. The term "measure of frequency" as used herein is intended to include any type of frequency information which can be derived from a phase-modulated signal.

While the exemplary embodiments of the present invention have been described with quadrature phase-shift keyed (QPSK) demodulation techniques. But, the principles of the present invention are not limited for use with any particular type of communication system, but is instead more generally applicable to any system in which it is desirable to provide improved phase demodulation performance without unduly increasing system complexity. For example, it will be apparent to those skilled in the art that the invention can be applied to demodulation of a wide variety of other types of phase-modulated signals.

The processing for generating a measure of frequency from a phase-modulated signal, and for generating a signature event can be performed at the network side using reverse-link signals transmitted by a mobile unit and received at multiple base stations. Similarly, the processing can be performed at the mobile unit using forward-link signals transmitted by multiple base stations.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A method for processing a received phase-modulated (PM) signal in a wireless communication system, the method comprising the steps of:
    (a) generating first and second copies of the PM signal;
    (b) phase demodulating the first copy to generate demodulated symbols for the PM signal;
    (c) frequency demodulating the second copy to generate a measure of instantaneous frequency or the PM signal; and
    (d) identifying a time for a symbol transition between the demodulated.symbols based on the measure instantaneous frequency.

2. The invention of claim 1 further comprising the step of:
    (e) generating a signature event based on the symbol transition.

3. The invention of claim 2 further comprising the step of:
    (f) determining a location for a mobile unit in the wireless communication system based on the time of the signature event.

4. The invention of claim 3 wherein step (f) comprises the step of performing a time difference of arrival (TDOA) algorithm based on a plurality of signature events.

5. The invention of claim 1 further comprising the step of:
    (e) determining a location for a mobile unit in the wireless communication system based on the time of the symbol transition.

6. The invention of claim 5 wherein step (e) comprises the step of performing a time difference of arrival (TDOA) algorithm based on a plurality of times for the symbol transition, each time corresponding to the processing of steps (a)–(d) performed on a different received PM signal.

7. The invention of claim 6 wherein each received PM signal is a reverse-link signal transmitted by the mobile unit and received at a different base station.

8. The invention of claim 6 wherein each received PM signal is a forward-link signal received by the mobile unit from a different base station.

9. The invention of claim 1 wherein the measure of the instantaneous frequency of the PM signal is a signal having a signature associated with a particular synchronization word utilized in the system.

10. The invention of claim 1 wherein the system is wireless TDMA communication system.

11. The invention of claim 1 wherein the phase-modulated signal is a quadrature phase-shift-keyed (QPSK) signal.

12. The invention of claim 11 wherein the phase-modulated signal is a $\pi/4$ differential quadrature phase-shift-keyed (DQPSK) signal.

13. An apparatus for processing a received phase-modulated (PM) signal in a wireless communication system, the apparatus comprising:
    (b) a splitter;
    (c) a phase demodulator coupled to the splitter;
    (d) a frequency demodulator coupled to the phase demodulator;
    (e) a processor having an input coupled to an output of the demodulator, wherein:
        the splitter is configured to generate first and second copies of the PM signal;
        the phase demodulator is configured to demodulate the first copy to generate demodulated symbols for the PM signal;
        the frequency demodulator is configured to demodulate the second copy to generate a measure of instantaneous frequency for the PM signal; and
        the processor is configured to identify a time for a symbol transition between the demodulated symbols based on the measure of instantaneous frequency.

14. The invention of claim 13 wherein the processor is configured to generate a signature event based on the symbol transitions.

15. The invention of claim 14 wherein the wireless communication system is configured to determine a location of a mobile unit in the wireless communication system based on the time of the signature event.

16. The invention of claim 15 wherein the wireless communication system is configured to perform a time difference of arrival (TDOA) algorithm based on a plurality of signature events.

17. The invention of claim 13 wherein the wireless communication system is configured to determine a location for a mobile unit in the wireless communication system based on the time of the symbol transition.

18. The invention of claim 17 wherein the location is determined using a TDOA algorithm based on a plurality of times for the symbol transition, each time corresponding to the processing performed on a different received PM signal.

19. The invention of claim 18 wherein each received PM signal is a reverse-link signal transmitted by the mobile unit and received at a different base station.

20. The invention of claim 18 wherein each received PM signal is a forward-link signal received by the mobile unit from a different base station.

21. The invention of claim 13 wherein the measure of the instantaneous frequency of the PM signal is a signal having a signature associated with a particular synchronization word utilized in the system.

22. The invention of claim 13 wherein the system is wireless TDMA communication system.

23. The invention of claim 13 wherein the phase-modulated signal is a quadrature phase-shift-keyed (QPSK) signal.

24. The invention of claim 13 wherein the phase-modulated signal is a $\pi/4$ differential quadrature phase-shift-keyed (DQPSK) signal.

25. A method for processing a received phase-modulated (PM) signal in a wireless communication system, the method comprising the steps of:
  (a) generating first and second copies of the PM signal;
  (b) phase demodulating the first copy to generate demodulated symbols for the PM signal;
  (c) frequency demodulating the second copy to generate a measure of frequency for the PM signal;
  (d) identifying a time for a symbol transition between the demodulated symbols based on the measure frequency;
  (e) generating a signature event based on the symbol transition; and
  (f) determining a location for a mobile unit in the wireless communication system based on the time o the signature event.

26. The invention of claim 25 wherein step (f) comprises the step of performing a time difference of arrival (TDOA) algorithm based on a plurality of signature events.

27. A method for processing a received phase-modulated (PM) signal in a wireless communication system, the method comprising the steps of:
  (a) generating first and second copies of the PM signal;
  (b) phase demodulating the first copy to generate demodulated symbols for the PM signal;
  (c) frequency demodulating the second copy to generate a measure of frequency for the PM signal;
  (d) identifying a time for a symbol transition between the demodulated symbols based on the measure frequency; and
  (e) determining a location for a mobile unit in the wireless communication system based on the time of the symbol transition.

28. The invention of claim 27 wherein step (e) comprises the step of performing a time difference of arrival (TDOA) algorithm based on a plurality of times for the symbol transition, each time corresponding to the processing of steps (a)–(d) performed on a different received PM signal.

29. The invention of claim 28 wherein each received PM signal is a reverse-link signal transmitted by the mobile unit and received at a different base station.

30. The invention of claim 28 wherein each received PM signal is a forward-link signal receive by the mobile unit from a different base station.

31. An apparatus for processing a received phase-modulated (PM) signal in a wireless communication system, the apparatus comprising:
  (a) a splitter;
  (b) a phase demodulator coupled to the splitter;
  (c) a frequency demodulator coupled to the phase demodulator;
  (d) a processor having an input coupled to an output of the demodulator, wherein:
    the splitter is configured to generate first and second copies of the PM signal;
    the phase demodulator is configured to demodulate the first copy to generate demodulated symbols for the PM signal;
    the frequency demodulator is configured to demodulate the second copy to generate a measure of frequency for the PM signal;
    the processor is configured to (i) identify a time for a symbol transition between the demodulated symbols based on the measure of frequency and (ii) generate a signature event based on the symbol transitions; and
    the wireless communication system is configured to determine a location of a mobile unit in the wireless communication system based on the time of the signature event.

32. The invention of claim, 31 wherein the wireless communication system is configured to perform a time difference of arrival (TDOA) algorithm based on a plurality of signature events.

33. An apparatus for processing a received phase-modulated (PM) signal in a wireless communication system, the apparatus comprising:
  (a) a splitter;
  (b) a phase demodulator coupled to the splitter;
  (c) a frequency demodulator coupled to the phase demodulator;
  (d) a processor having an input coupled to an output of the demodulator, wherein:
    the splitter is configured to generate first and second copies of the PM signal;
    the phase demodulator is configured to demodulate the first copy to generate demodulated symbols for the PM signal;
    the frequency demodulator is configured to demodulate the second copy to generate a measure of frequency for the PM signal;
    the processor is configured to identify a time for a symbol transition between the demodulated symbols based on the measure of frequency; and
    the wireless communication system is configured to determine a location for a mobile unit in the wireless communication system based on the time of the symbol transition.

34. The invention of claim 33 wherein the location is determined using a TDOA algorithm based on a plurality of times for the symbol transition, each time corresponding to the processing performed on a different received PM signal.

35. The invention of claim 34 wherein each received PM signal is a reverse-link signal transmitted by the mobile unit and received at a different base station.

36. The invention of claim 34 wherein each received PM signal is a forward-link signal received by the mobile unit from a different base station.

* * * * *